United States Patent [19]

Corrion et al.

[11] Patent Number: 5,507,447
[45] Date of Patent: Apr. 16, 1996

[54] SEAT BELT RETRACTOR WITH CINCH MECHANISM

[75] Inventors: Steven G. Corrion, Oxford; Donald E. Foxworth, Macomb Township; Russell L. Hardy, New Haven; Franklin L. Kiiskila, Leonard, all of Mich.

[73] Assignee: TRW Vehicle Safety Systems Inc., Lyndhurst, Ohio

[21] Appl. No.: 327,866

[22] Filed: Oct. 24, 1994

[51] Int. Cl.⁶ ................................................. B60R 22/415
[52] U.S. Cl. ................................................. 242/382.2
[58] Field of Search ........................... 242/382.2, 382.1, 242/382.4; 280/806, 807; 297/476, 478

[56] References Cited

U.S. PATENT DOCUMENTS

| | | | |
|---|---|---|---|
| 3,794,266 | 2/1974 | Schwartz | 242/382.1 |
| 4,309,001 | 1/1982 | Ahad . | |
| 4,565,338 | 1/1986 | Takada | 242/382.2 |
| 4,566,649 | 1/1986 | Petersen, III . | |
| 4,747,562 | 5/1988 | Tsukamoto et al. . | |
| 4,749,143 | 6/1988 | Tsukamoto et al. . | |
| 4,767,082 | 8/1988 | Schmidt et al. | 242/382.2 |
| 5,014,926 | 5/1991 | Rumpf et al. . | |
| 5,294,070 | 3/1994 | Sugano et al. . | |

*Primary Examiner*—John M. Jillions
*Attorney, Agent, or Firm*—Tarolli, Sundheim, Covell, Tummino & Szabo

[57] ABSTRACT

A seat belt retractor (10) includes a spool (70) which is rotatable about a first axis (52). An idler gear (270) is disposed in an opening (254) in a drive disc (240) which is rotatable about the first axis (52). The idler gear (270) rotates, in response to rotation of the spool (70), about a second axis (256) which is spaced from the first axis (52). As the idler gear (270) rotates about the second axis (256), it also orbits about the first axis (52) and causes the drive disc (240) to rotate about the first axis. The drive disc (240) moves a cinch lever (200) into a cinching position to block rotation of the spool (70) in a belt withdrawal direction (76) after a first predetermined amount of webbing (16) is withdrawn from the spool (70) and then a second predetermined amount of webbing is rewound on the spool.

17 Claims, 8 Drawing Sheets

SEAT BELT RETRACTOR WITH CINCH MECHANISM

BACKGROUND OF THE INVENTION

1. Technical Field

The present invention relates to a vehicle seat belt webbing retractor, and particularly to a retractor including a cinch mechanism for blocking withdrawal of belt webbing in response to rotation of a spool of the retractor in a certain predetermined manner.

2. Description of the Prior Art

A typical seat belt system used to restrain a vehicle occupant includes a length of belt webbing wound on a spool of a seat belt webbing retractor. The belt webbing is extensible about a vehicle occupant to restrain the occupant.

In some seat belt systems, the webbing is prevented from being further withdrawn from the retractor throughout the time that the webbing is secured around the vehicle occupant, i.e., the webbing is maintained in a clinched condition. It is desirable to be able to set a seat belt webbing retractor manually to block withdrawal of belt webbing from the spool. Seat belt webbing retractors are known which include a manually engageable cinch lever for placing the retractor into a cinching mode to block rotation of the spool in the belt withdrawal direction. Seat belt webbing retractors are also known which assume a cinching mode in response to rotation of the retractor spool in a certain predetermined manner.

SUMMARY OF THE INVENTION

The present invention is a seat belt webbing retractor comprising a spool on which seat belt webbing is wound. The spool is rotatable about a first axis in a belt winding direction and in an opposite belt withdrawal direction. A ratchet is also rotatable about the first axis. A pawl is pivotally movable between a disengaged position and an engaged position. In the engaged position, the pawl engages the ratchet to block rotation of the ratchet in the belt withdrawal direction and thereby block rotation of the spool in the belt withdrawal direction.

A gear train includes a plurality of gears rotatable in response to rotation of the spool. One gear of the gear train is rotatable about a second axis which is spaced from the first axis and which moves around the first axis.

A control mechanism controls movement of the pawl into the engaged position after a first predetermined amount of seat belt webbing is withdrawn from the spool and then a second predetermined amount of webbing is rewound on the spool. The control mechanism includes a member which rotates in response to rotation of the spool. The member is rotatable about the first axis, in response to movement of the second axis and the one gear around the first axis, to control movement of the pawl between the engaged position and the disengaged position.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
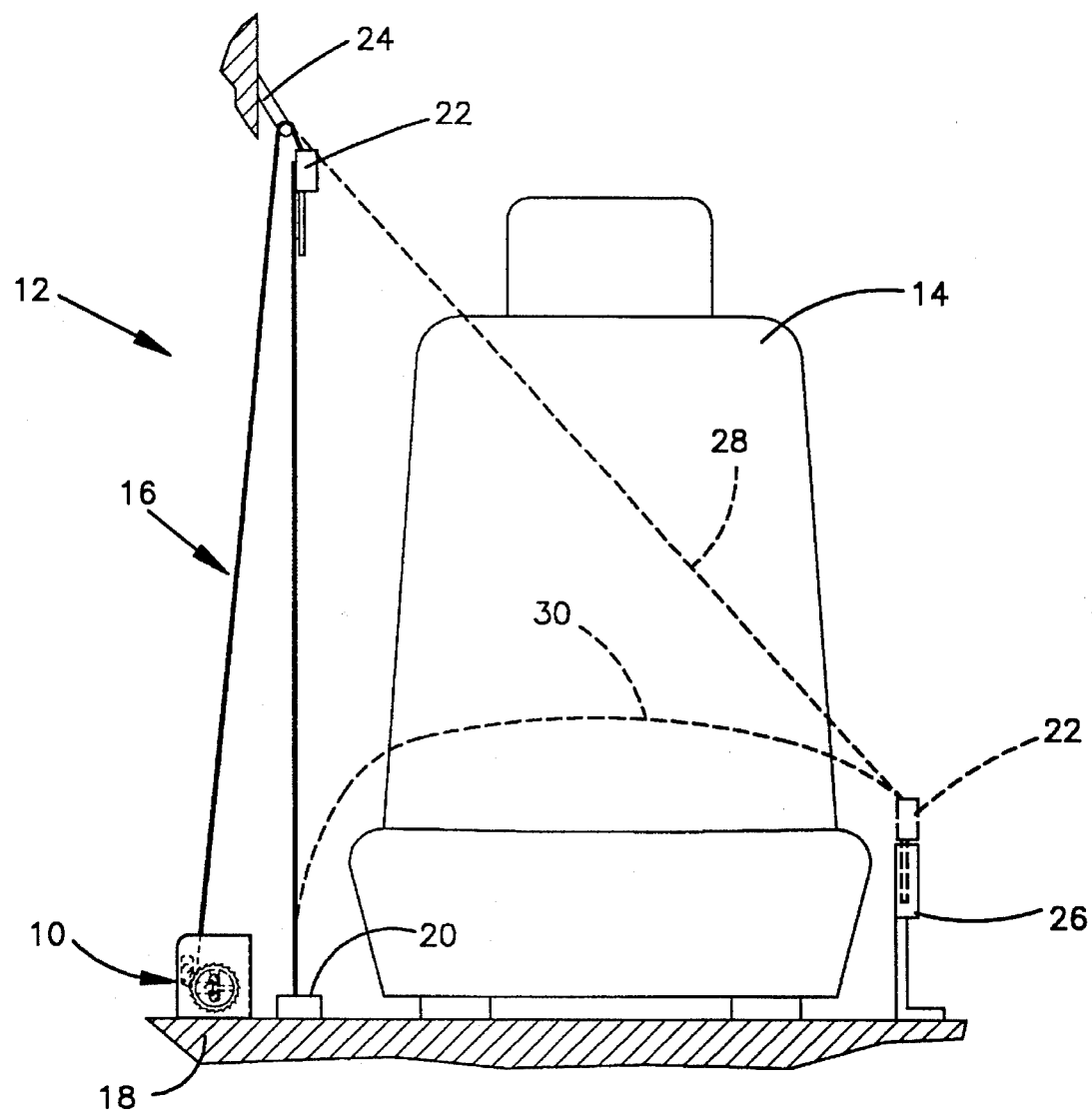
FIG. 1 is a schematic illustration of a vehicle seat belt system including a seat belt webbing retractor in accordance with the present invention.

The present invention relates to a vehicle seat belt webbing retractor and particularly to a retractor including a cinch mechanism for blocking withdrawal of belt webbing in response to rotation of a spool of the retractor in a certain predetermined manner. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, an occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

Figure 11:
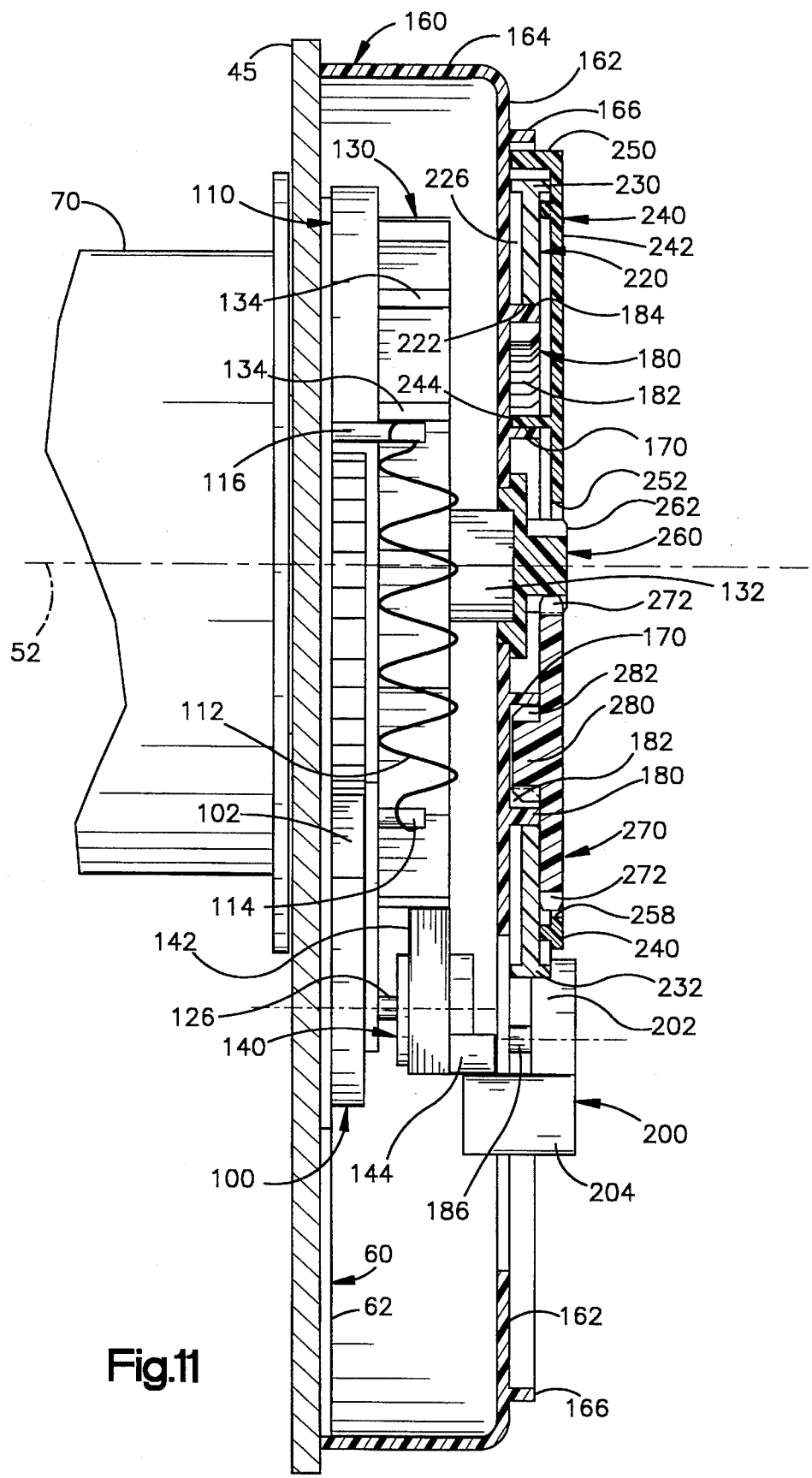
FIG. 11 is a sectional view of parts of the retractor of FIG. 1, including the cinch mechanism, taken along line 11—11 of FIG. 3 and with parts removed.

The retractor 10 (FIGS. 2, 2A and 11) includes a frame 40 which is fixed to the vehicle body 18 in a manner not shown. The frame 40 is a single piece of sheet metal stamped and formed to a U-shaped configuration as best seen in FIG. 2A. The frame 40 includes a back wall 42 and spaced parallel side walls 44 and 46 which extend generally perpendicular to the back wall.

A circular opening 48 is formed in one frame side wall 44. A circular opening 50 is formed in the other frame side wall 46. The centers of the openings 48 and 50 are disposed on a spool axis 52 of the retractor 10. The spool axis 52 extends between the frame side walls 44 and 46 in a direction parallel to the frame back wall 42.

A bearing plate 60 is fixed to the frame side wall 46. A planar wall portion 62 of the bearing plate 60 is disposed in abutting engagement with the frame side wall 46. An annular ring portion 64 of the bearing plate 60 projects axially from the wall portion 62 in a direction away from the frame 40. The ring portion 64 extends circumferentially around a central opening 66 of the bearing plate 60. The ring portion 64 and the central opening 66 are centered on the spool axis 52.

Figure 2:
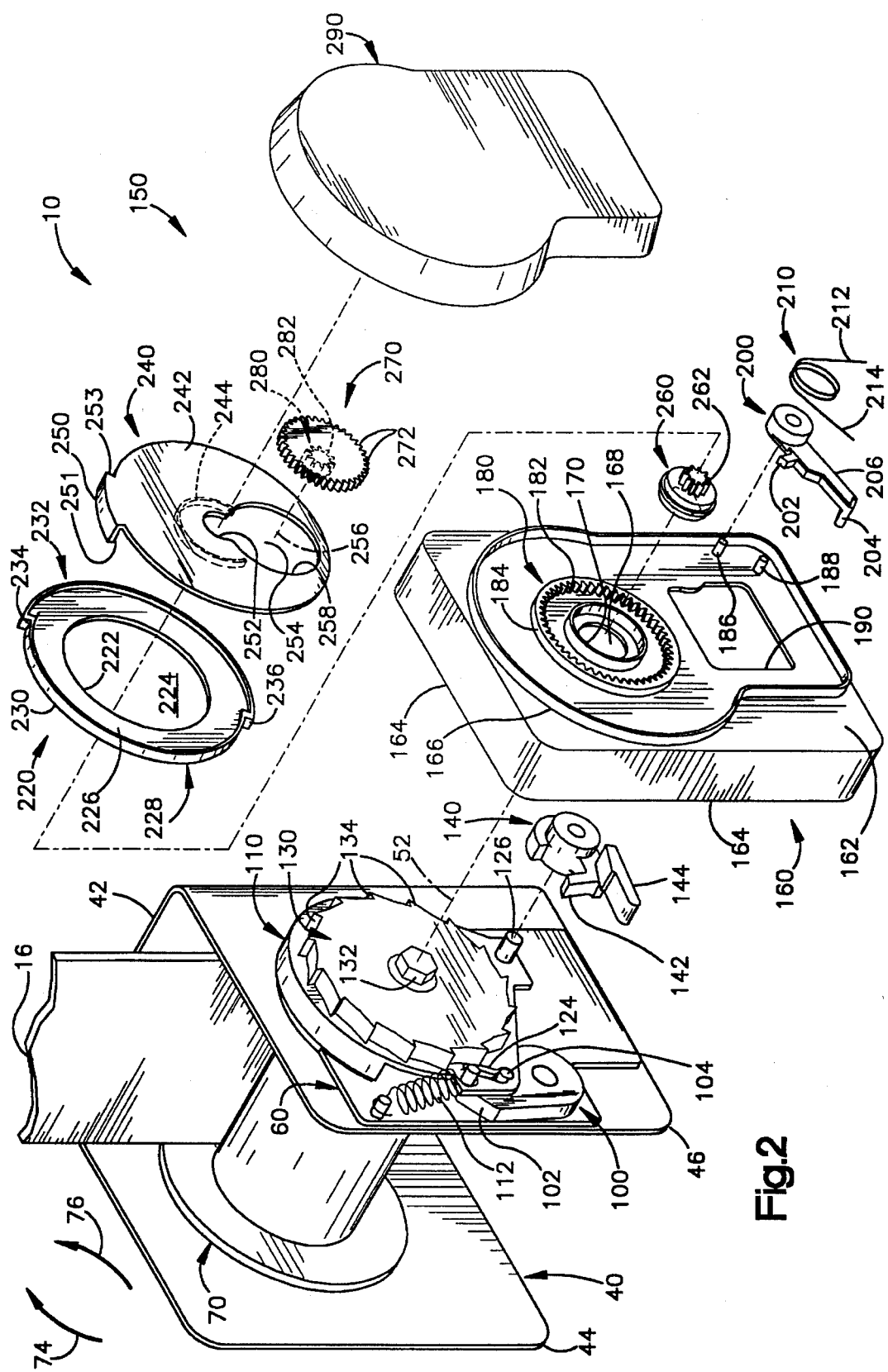
FIG. 2 is an exploded perspective view of the retractor of FIG. 1 with parts removed.
Figure 2A:
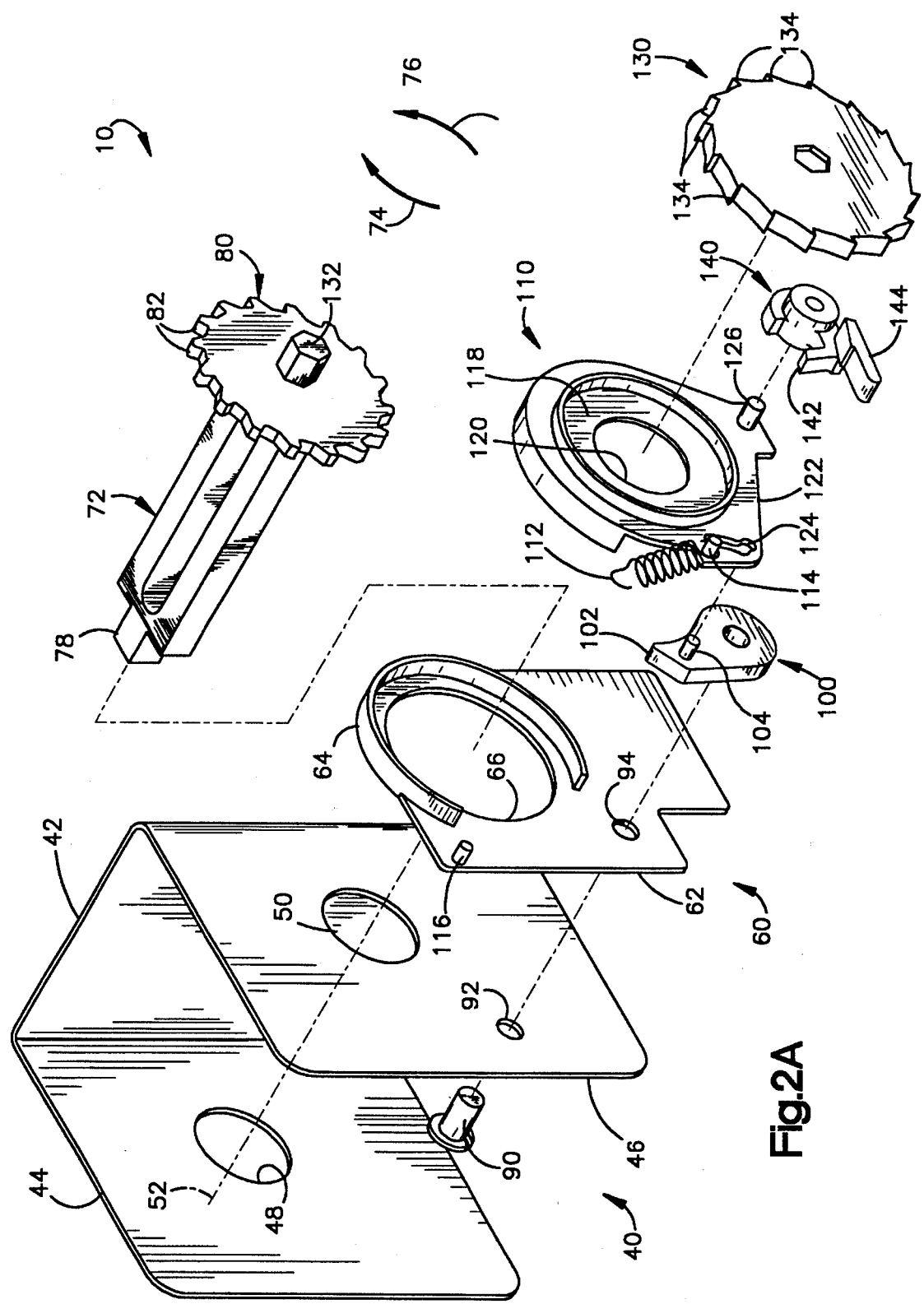
FIG. 2A is an exploded perspective view similar to FIG. 2 showing some parts not shown in FIG. 2.

The retractor 10 includes a spool 70 (FIG. 2). A metal shaft 72 (FIG. 2A) extends through the spool 70 and is fixed for rotation with the spool. The spool 70 and the shaft 72 are supported on the frame 40 for rotation about the spool axis 52 relative to the frame 40 in a belt winding direction 74 and in an opposite belt withdrawal direction 76. The seat belt webbing 16 (FIG. 2) is wound on the spool 70.

A rewind spring mechanism (not shown) on the side of the frame side wall 44 opposite from the spool 70 is connected with a first end portion 78 (FIG. 2A) of the shaft 72. The rewind spring mechanism biases the spool 70 for rotation in the belt winding direction 74. A spool locking ratchet wheel 80 is fixed on the opposite end of the shaft 72 for rotation with the shaft and thereby with the spool 70. A plurality of ratchet teeth 82 are disposed in a circular array on the outer periphery of the spool locking ratchet wheel 80.

A lock pawl support post 90 (FIG. 2A) extends through aligned openings 92 and 94 in the frame side wall 46 and the bearing plate 60, respectively. The lock pawl support post 90 projects axially from the bearing plate 60 in a direction away from the frame 40 and the spool 70 (to the right as viewed in FIG. 2A). A lock pawl 100 is supported on the lock pawl support post 90 for pivotal movement relative to the lock pawl support post. The lock pawl 100 includes a tooth 102 which is spaced apart from the lock pawl support post 90. The tooth 102 on the lock pawl 100 is disposed axially coincident with the ratchet teeth 82 on the spool locking ratchet wheel 80. That is to say, the tooth 102 lies in the same plane as the ratchet teeth 82. A pin 104 on the lock pawl 100 projects axially from the lock pawl in a direction away from the frame 40 and the spool 70 (to the right as viewed in FIG. 11).

An actuator 110 (FIG. 2A) is supported on the ring portion 64 of the bearing plate 60 for limited rotation about the spool axis 52. A return spring 112 acting between a spring support 114 on the actuator 110 and a spring support 116 on the bearing plate 60 biases the actuator in the belt winding direction 74.

The actuator 110 includes a radially extending disc portion 118 which defines a circular central opening 120 of the actuator. The actuator 110 also includes a radially extending cam portion 122. A cam slot 124 extends through the cam portion 122 of the actuator 110 and receives the pin 104 of the lock pawl 100. A pilot pawl support post 126 projects axially from the actuator 110 in a direction away from the frame 40. The pilot pawl support post 126 is fixed for movement with the actuator 110.

A pilot ratchet 130 (FIG. 2A) is fixed for rotation on a hexagonal end portion 132 of the shaft 72 which projects beyond the ratchet wheel 80. A plurality of ratchet teeth 134 are disposed in a circular array on the outer periphery of the pilot ratchet 130. Alternatively, the shaft 72 can have a square end portion received in a square bore in the pilot ratchet 130. The pilot ratchet 130 would then include a hexagonal projection configured like the end portion 132.

A pilot pawl 140 (FIGS. 2 and 2A) is supported on the pilot pawl support post 126 for pivotal movement relative to the actuator 110. The pilot pawl 140 has a tooth 142 which projects upward and radially in a direction toward the ratchet teeth 134 on the pilot ratchet 130. The tooth 142 on the pilot pawl 140 is disposed axially coincident with (i.e., lies in the same plane as) the ratchet teeth 134 on the pilot ratchet 130. The pilot pawl 140 normally is disposed, under the influence of gravity, in a position in which the tooth 142 is spaced downward from and radially outward from the teeth 134 on the pilot ratchet 130. An end portion 144 of the pilot pawl 140 projects radially outward from the tooth 142. The retractor 10 includes a vehicle deceleration sensing assembly (not shown) for moving the pilot pawl 140 into engagement with the pilot ratchet 130 in the event of sudden vehicle deceleration such as occurs in a vehicle collision.

The retractor 10 includes a cinch mechanism designated generally 150 (FIG. 2) for selectively manually moving the pilot pawl 140 into engagement with the pilot ratchet 130 to block rotation of the spool 70 in the belt withdrawal direction 76. The cinch mechanism 150 includes an inner cover 160. The inner cover 160 is a one-piece plastic member having a main wall 162 which extends parallel to the side walls 44 and 46 of the frame 40. An outer peripheral wall 164 projects axially from the main wall 162 in a direction toward the frame 40. The outer peripheral wall 164 is secured to the side wall 46 of the frame 40 in a manner not shown. An outer peripheral support lip 166 on the inner cover 160 projects axially from the main wall 162 in a direction away from the frame 40 (i.e., to the right as viewed in FIG. 2).

A circular opening 168, centered on the spool axis 52, is formed in the main wall 162 of the inner cover 160. An annular rim 170 extends around the central opening 168 and projects axially from the main wall 162 in a direction away from the frame 40 (i.e., to the right as viewed in FIG. 2). The rim 170 is concentric with and is spaced radially outward from the central opening 168.

An internally toothed ring gear 180 is formed on the inner cover 160 at a location spaced radially outward from the rim 170. The ring gear 180 projects axially from the main wall 162 in a direction away from the frame 40 (i.e., to the right as viewed in FIG. 2). The ring gear 180 is circular in configuration and is centered on the spool axis 52. A plurality of internal gear teeth 182 are disposed in a circular array on the inner periphery of the ring gear 180. The outer periphery of the ring gear 180 forms an annular axially extending support surface 184 on the inner cover 160.

A cinch lever support post 186 projects axially from the main wall 162 of the inner cover 160 in a direction away from the frame 40 (i.e., to the right as viewed in FIG. 2). A spring pin 188 disposed below the cinch lever support post 186 projects axially from the main wall 162 in a direction parallel to the cinch lever support post. A lever opening 190 is formed in the main wall 162 of the inner cover 160 at a location below the ring gear 180.

The cinch mechanism 150 includes a cinch lever 200 (FIG. 2) which is supported for pivotal movement on the cinch lever support post 186. The cinch lever 200 has a radially extending arm portion 206 and a projection 202 which extends upward from the arm portion 206 in a direction generally toward the spool axis 52. A lifting portion 204 of the cinch lever 200 projects axially from the arm portion 206. The lifting portion 204 of the cinch lever 200 extends under the end portion 144 of the pilot pawl 140 so that upward pivotal movement of the cinch lever 200 results in upward pivotal movement of the pilot pawl 140 toward the pilot ratchet 130.

A cinch lever spring 210 is supported on the cinch lever 200. A first arm 212 of the cinch lever spring 210 is received against the spring pin 188 on the inner cover 160. A second arm 214 of the cinch lever spring 210 extends underneath the arm portion 206 of the cinch lever 200. The cinch lever spring 210 biases the cinch lever 200 for pivotal movement about the cinch lever support post 186 in a clockwise direction as viewed in FIGS. 3–10.

Figure 8:
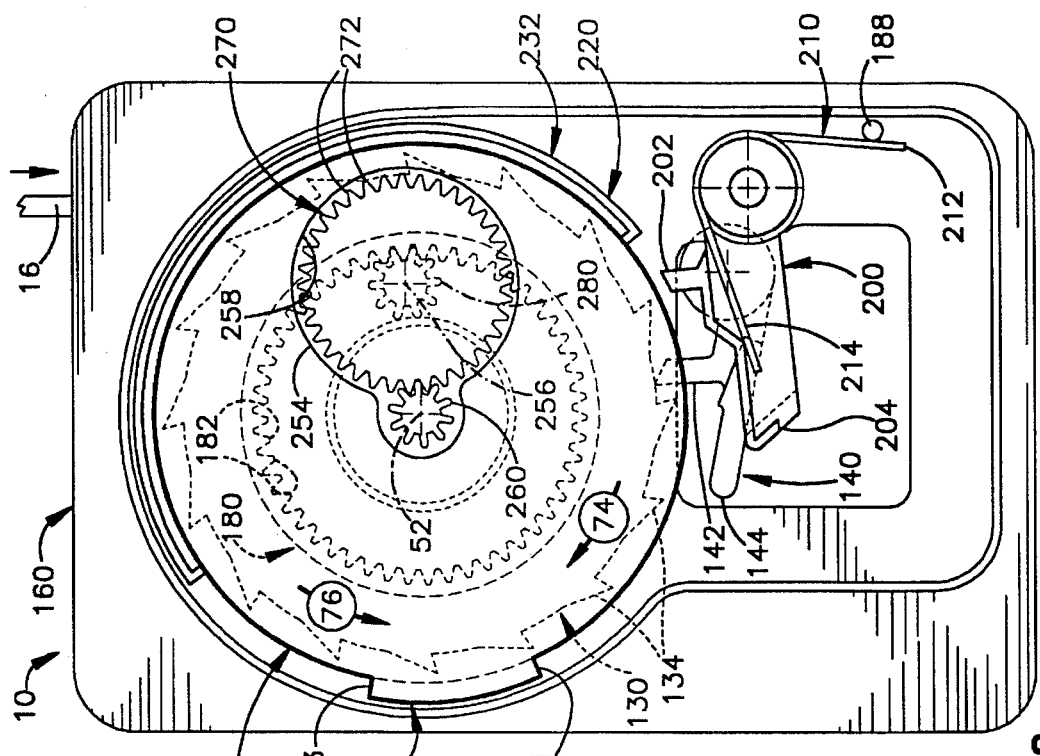
FIG. 8 is a view similar to FIG. 7 showing the cinch mechanism still in the cinching mode and after further rotation of the retractor spool in a belt winding direction.
Figure 9:
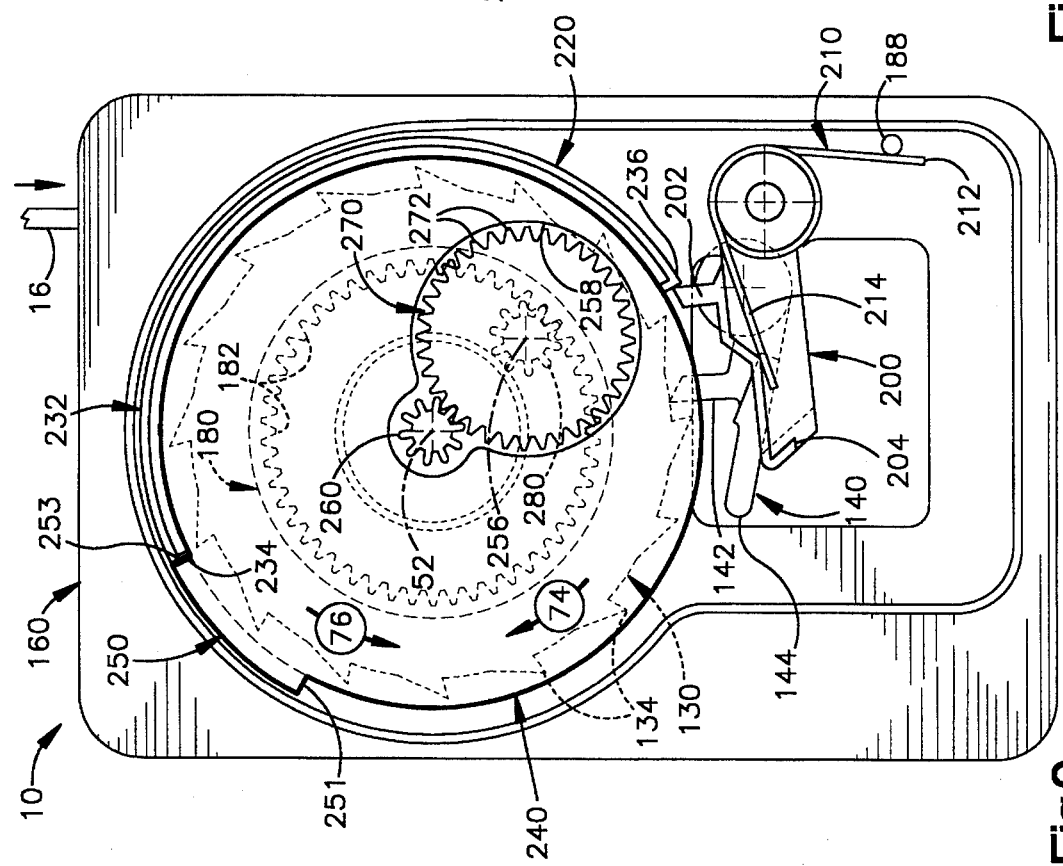
FIG. 9 is a view similar to FIG. 8 showing the cinch mechanism still in the cinching mode and after still further rotation of the retractor spool in a belt winding direction.

The cinch mechanism 150 of the retractor 10 also includes a control mechanism for moving the cinch lever 200 between a non-cinching position as viewed in FIGS. 3–7 and a cinching position as viewed in FIGS. 8 and 9. The control mechanism includes a cam disc 220. The cam disc 220 (FIG. 2) is a one-piece plastic member having an annular configuration. A circular inner peripheral surface 222 of the cam disc 220 defines a circular opening 224 which is centered on the spool axis 52. The inner peripheral surface 222 of the cam disc 220 is rotatable on the outer peripheral surface 184 (FIG. 11) of the ring gear 180. The cam disc 220 is thereby supported on the inner cover 160 for rotation about the spool axis 52.

A planar disc portion 226 (FIG. 2) of the cam disc 220 extends radially outward from the inner peripheral surface 222. An outer peripheral rim 228 of the cam disc 220 projects in opposite axial directions from the outer periphery of the disc portion 226. The rim 228 includes a first portion 230 which extends for about 180° around the outer periphery of the cam disc 220. The remaining portion of the rim 228 is formed as a cam lobe 232 which extends for about 180° around the outer periphery of the cam disc 220. The cam lobe 232 has a greater radius of curvature than the rim portion 230. The cam lobe 232 has first and second opposite radially extending end portions 234 and 236.

The control mechanism of the cinch mechanism 150 also includes a drive disc 240 (FIG. 2) which is made from plastic, preferably acetal. The drive disc 240 includes a planar generally circular radially extending disc portion 242 which is disposed axially farther from the frame 40 (to the right as viewed in FIG. 11) than the disc portion 226 of the cam disc 220. An annular inner rim 244 on the drive disc 240 is centered on the spool axis 52 and projects axially toward the frame 40 (to the left as viewed in FIG. 11) from the disc portion 242 of the drive disc. The rim 244 is rotatable on the annular rim 170 of the inner cover 160. The drive disc 240 is thereby supported on the inner cover 160 for rotation about the spool axis 52 relative to the inner cover.

A cam lobe 250 (FIG. 2) of the drive disc 240 projects axially from the outer periphery of the disc portion 242 in a direction toward the frame 40 and the spool 70. The cam lobe 250 of the drive disc 240 is disposed axially coincident with (i.e., lies in the same plane as) the cam lobe 232 of the cam disc 220. The cam lobe 250 has opposite circumferential end portions 251 and 253. In the illustrated embodiment, the cam lobe 250 has a circumferential extent of about 35° around the outer periphery of the drive disc 240.

A small diameter generally circular opening 252 (FIG. 2) in the drive disc 240 is centered on the spool axis 52. A portion of the circular opening 252 overlaps with a portion of a larger diameter generally circular opening 254 in the disc portion 242 of the drive disc 240. The circular opening 254 is centered on a second axis 256 which is spaced radially outward from the spool axis 52. The circular opening 254 is defined by an annular axially extending inner peripheral surface 258 of the disc portion 242 of the drive disc 240.

The control mechanism portion of the cinch mechanism 150 further includes a gear train for moving the drive disc 240 and thereby the cam disc 220 in response to rotation of the spool 70 about the spool axis 52. The gear train includes the ring gear 180 described above. The gear train also includes a pinion gear 260 (FIGS. 2 and 11) mounted on the hexagonal end portion 132 of the shaft 72. The pinion gear 260 is fixed for rotation with the shaft 72 and with the spool 70. A circular array of external gear teeth 262 is formed on the outer periphery of the pinion gear 260. The pinion gear 260 projects into the small diameter central opening 252 in the drive disc 240.

The gear train of the cinch mechanism 150 also includes an idler gear 270. The idler gear 270 is a plastic spur gear, preferably made from nylon, which is disposed in the circular opening 254 in the drive disc 240. A circular array of external gear teeth 272 is formed on the outer periphery of the idler gear 270. The external gear teeth 272 on the idler gear 270 are in meshing engagement with the external gear teeth 262 on the pinion gear 260. The idler gear 270 is rotatable about the second axis 256 in response to rotation of the pinion gear 260 about the spool axis 52.

The diameter of the idler gear 270 is selected to be the same as or slightly less than the diameter of the circular opening 254 in the drive disc 240, so as to enable the idler gear to rotate within the opening 254. The crests of the gear teeth 272 of the idler gear 270 are engageable with the inner peripheral surface 258 of the drive disc 240 upon movement of the idler gear relative to the drive disc. In FIGS. 3–11, the crests of the gear teeth 272 are, for clarity, shown spaced radially inward from the inner peripheral surface 258 which defines the circular opening 254 in the drive disc 240.

The gear train of the cinch mechanism 150 also includes an intermediate gear 280 (FIG. 2). The intermediate gear 280 is preferably formed as one piece with the idler gear 270 and is fixed for movement with the idler gear. The intermediate gear 280 is a spur gear having a smaller diameter than the idler gear 270. The intermediate gear 280 includes a circular array of external gear teeth 282 which are concentric with the gear teeth 272 on the idler gear 270 and which project axially from the idler gear in a direction toward the frame 40 and the spool 70. The intermediate gear 280 is thus centered on the second axis 256 which is the axis of rotation of the idler gear 270. The intermediate gear 280 is disposed radially between the internal gear teeth 182 of the ring gear 180 and the annular rim 170 of the inner cover 160.

The cinch mechanism 150 also includes an outer cover 290 (FIG. 2). The outer cover 290 is made from plastic and includes locking tabs (not shown) for securing the outer cover to the inner cover 160. The outer cover 290 fits around the outer peripheral rim 166 of the inner cover 160 to enclose the other components of the cinch mechanism 150. The outer cover 290 may also include inner surface portions (not shown) for securing other components of the cinch mechanism 150, such as the cinch lever 200, in position between the outer cover and the inner cover 160.

Figures 3, 4:
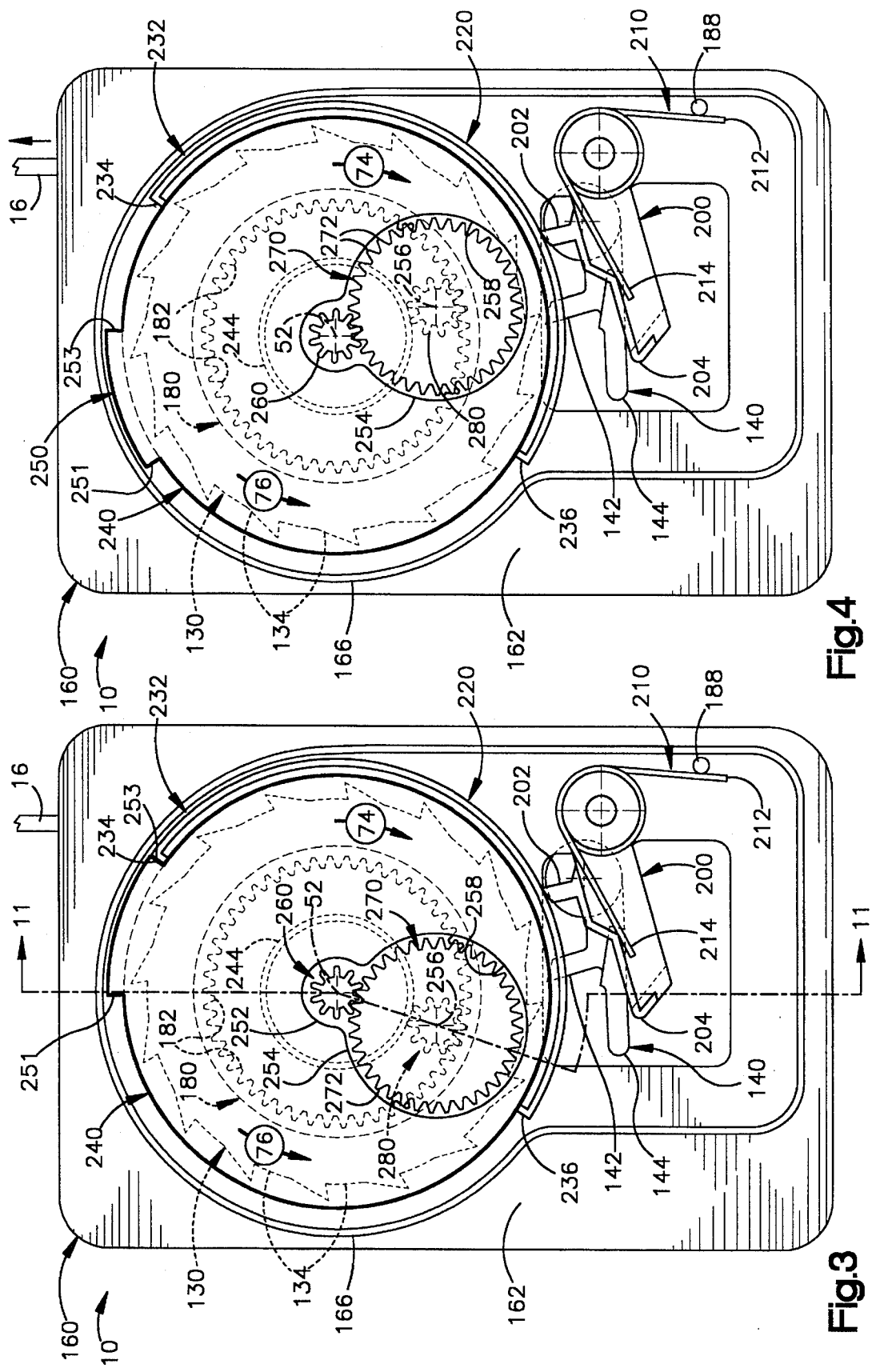
FIG. 3 is an end view of parts of the retractor of FIG. 1 showing a cinch mechanism in a non-cinching mode with the seat belt webbing fully wound on the retractor spool.
FIG. 4 is a view similar to FIG. 3 showing the cinch mechanism still in the non-cinching mode and after a small amount of rotation of the retractor spool in a belt withdrawal direction.

FIG. 3 illustrates the position of the parts of the cinch mechanism 150 of the retractor 10 when the belt webbing 16 is fully wound on the spool 70. The end portion 253 of the cam lobe 250 on the drive disc 240 is in abutting engagement with the end portion 234 of the cam lobe 232 of the cam disc 220. The cam lobe 232 on the cam disc 220 is disposed radially inward of the projection 202 on the cinch lever 200 so that the projection 202 rides on the cam lobe 232. The cam lobe 232 on the cam disc 220 thus holds the cinch lever 200 in a radially outward non-cinching position against the biasing effect of the spring 210. The cinch lever 200 does not urge the pilot pawl 140 radially inward into engagement with the pilot ratchet 130. Thus, the cinch mechanism 150 is in a non-cinching mode and does not block the spool 70 from rotation in the belt withdrawal direction 76.

When the vehicle occupant withdraws belt webbing 16 from the retractor 10, the spool 70 rotates about the spool axis 52 in the belt withdrawal direction 76, that is, counterclockwise as viewed in FIG. 4. The pinion gear 260 (FIG. 4), which is fixed for rotation with the spool 70, also rotates in the belt withdrawal direction 76. The idler gear 270, which is in meshing engagement with the pinion 260, rotates in the opposite direction, that is, clockwise as viewed in FIGS. 3 and 4. The idler gear 270 rotates about the second axis 256. The intermediate gear 280, which is fixed for rotation with the idler gear 270, also rotates about the second axis 256 in a clockwise direction as viewed in FIGS. 3 and 4.

The rotating intermediate gear 280 is in meshing engagement with the ring gear 180. Because the ring gear 180 is fixed in position, the rotation of the intermediate gear 280 results in orbital movement of the intermediate gear around the interior of the circular ring gear. The intermediate gear 280 orbits, or moves bodily, in a circular path centered on the spool axis 52, in a counterclockwise direction as viewed in FIGS. 3 and 4.

As the intermediate gear 280 orbits around the interior of the ring gear 180, the idler gear 270, which is fixed for movement with the intermediate gear, also moves in a counterclockwise path around the spool axis 52. The second axis 256, which is the center of rotation of the idler gear 270 and of the intermediate gear 280, likewise moves in a circular path counterclockwise about the first axis 52.

The crests of the external teeth 272 on the idler gear 270 push against the inner peripheral surface 258 which defines the circular opening 254 in the drive disc 240. The force of the moving idler gear 270 is transmitted from the idler gear through the gear teeth 272 and through the surface 258 into the drive disc 240. This force causes the drive disc 240 to rotate about the spool axis 52, in a counterclockwise direction as viewed in FIGS. 3 and 4.

Figure 5:
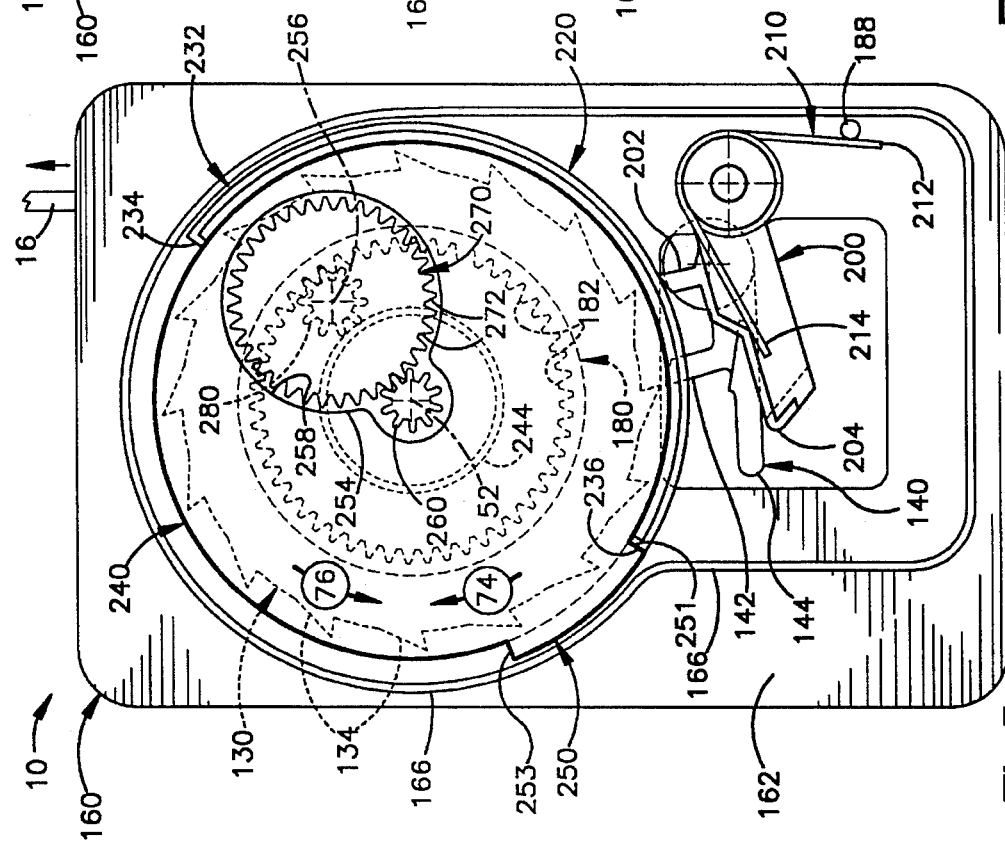
FIG. 5 is a view similar to FIG. 4 showing the cinch mechanism still in the non-cinching mode and after further rotation of the retractor spool in a belt withdrawal direction.

As the drive disc 240 rotates about the spool axis 52, the cam lobe 250 on the drive disc moves circumferentially away from the end portion 234 of the cam lobe 232 on the cam disc 220, as can be seen in a comparison between FIGS. 3 and 4. During continued withdrawal of belt webbing 16 from the spool 70, the cam lobe 250 on the drive disc 240 moves about 180° around the spool axis 52 until it engages the end portion 236 of the cam lobe 232 on the cam disc 220 as seen in FIG. 5. The drive disc 240 continues to rotate in a counterclockwise direction as viewed in FIG. 5, and pushes the cam disc 220 to rotate in the same direction around the spool axis 52.

Continued withdrawal of belt webbing 16 from the spool 70 causes the cam lobe 250 on the drive disc 240 to push the cam lobe 232 on the cam disc 220 circumferentially out from its position radially inward of the projection 202 on the cinch lever 200. Simultaneously, the cam lobe 250 on the drive disc 240 moves to a position shown in FIG. 6 radially inward of the projection 202 on the cinch lever 200. The cam lobe 250 on the drive disc 240 reaches the position shown in FIG. 6 when a first predetermined amount of the belt webbing 16 has been withdrawn from the retractor 10, typically substantially the full amount of belt webbing on the spool 70.

The cam lobe 250 on the drive disc 240 holds the cinch lever 200 radially outward against the bias of the cinch lever spring 210. The cinch lever 200 is thus maintained in a radially outward, non-cinching position. The cinch lever 200 does not urge the pilot pawl 140 into engagement with the pilot ratchet 130. The retractor 10 is in a non-cinching mode.

The vehicle occupant then engages the tongue assembly 22 (FIG. 1) with the buckle 26 and releases the belt webbing 16 and the tongue assembly. Under the influence of the rewind spring mechanism, a second predetermined amount of belt webbing 16 retracts into the retractor 10. The spool 70 rotates about the spool axis 52 in the belt winding direction 74. The pinion gear 260, which is fixed for rotation with the spool 70, also rotates in the belt winding direction 74, that is, clockwise as viewed in FIGS. 6 and 7. The idler gear 270, which is in meshing engagement with the pinion gear 260, rotates in the opposite direction, that is, counterclockwise as viewed in FIGS. 6 and 7. The idler gear 270 rotates about the second axis 256.

Figure 6:
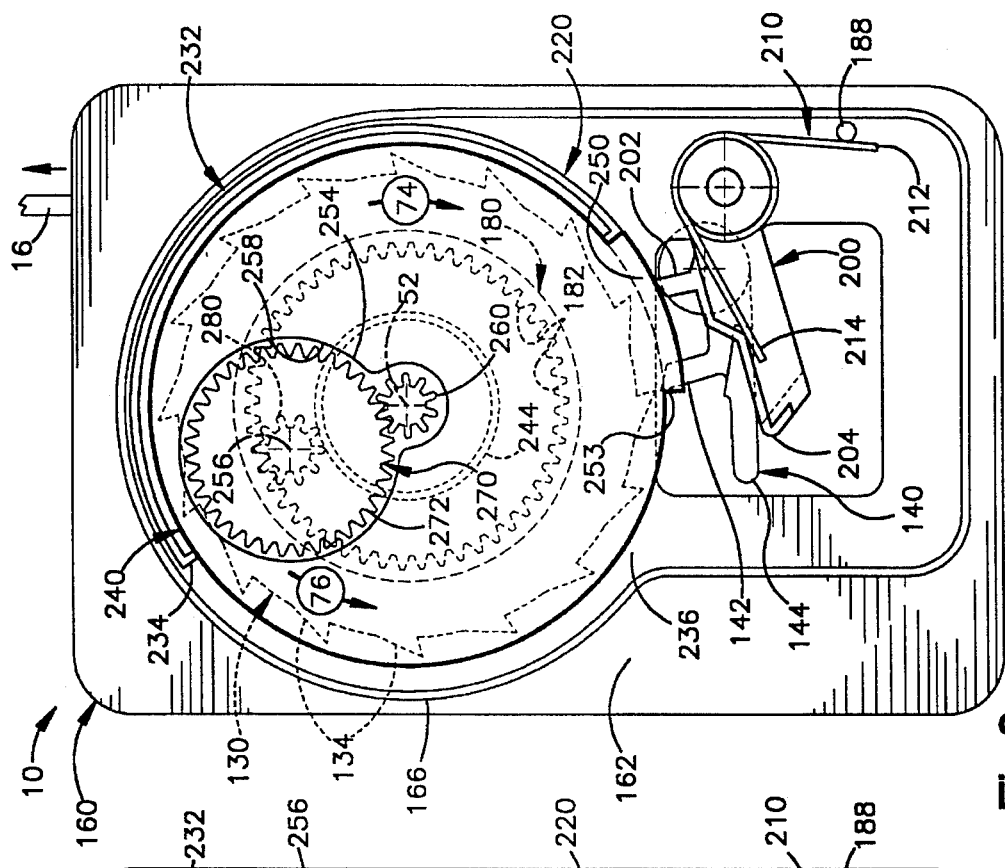
FIG. 6 is a view similar to FIG. 5 showing the cinch mechanism still in the non-cinching mode and after still further rotation of the retractor spool in a belt withdrawal direction.
Figure 7:
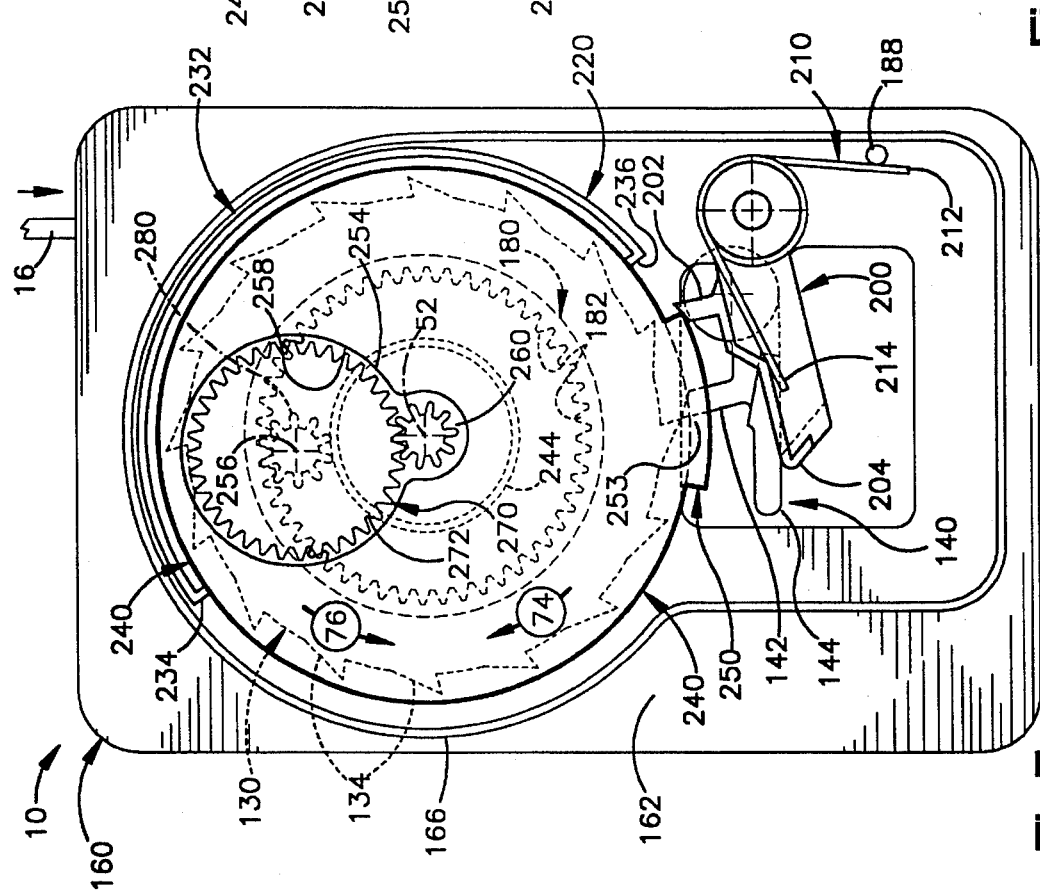
FIG. 7 is a view similar to FIG. 6 showing the cinch mechanism moving into a cinching mode after a small amount of rotation of the retractor spool in a belt winding direction.
Figure 10:
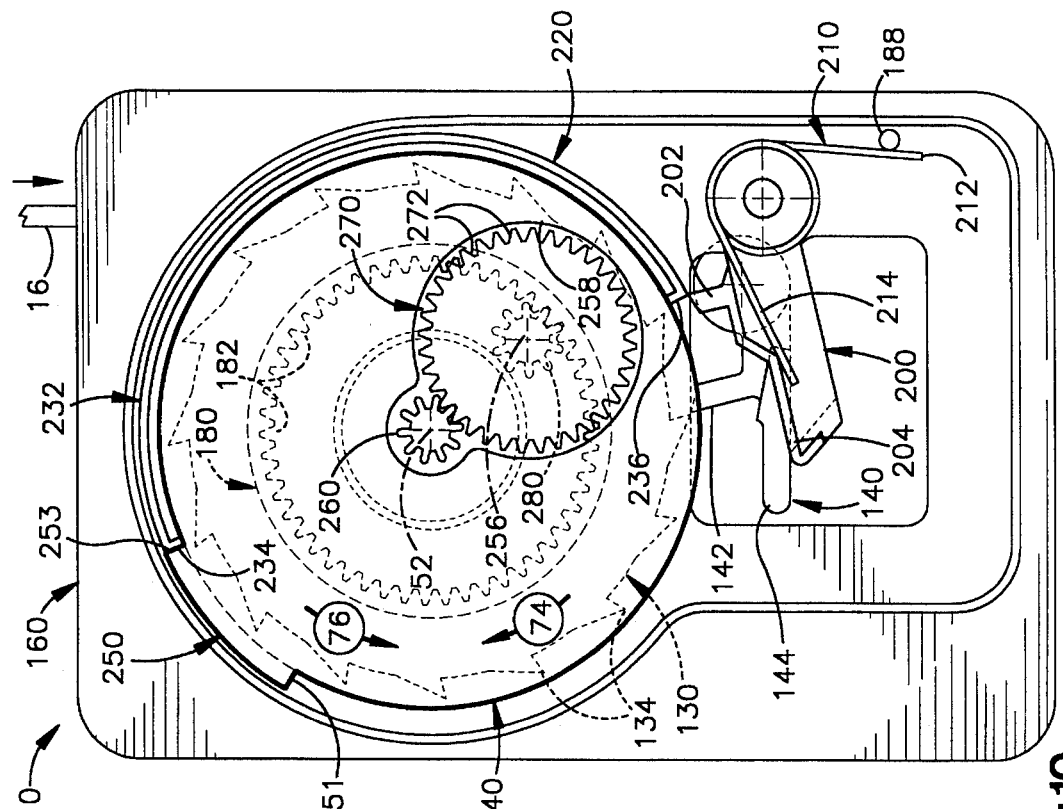
FIG. 10 is a view similar to FIG. 9 showing the cinch mechanism moving out of the cinching mode after still further rotation of the retractor spool in a belt winding direction.

The intermediate gear 280, which is fixed for movement with the idler gear 270, also rotates about the second axis 256 in a counterclockwise direction as viewed in FIGS. 6 and 7. Because the intermediate gear 280 is in meshing engagement with the fixed ring gear 180, the rotation of the intermediate gear 280 results in bodily movement of the intermediate gear around the interior of the circular ring gear. The intermediate gear 280 orbits in a circular path centered on the spool axis 52, in a clockwise direction as viewed in FIGS. 6 and 7. The idler gear 270, which is fixed for movement with the intermediate gear 280, also moves in a circular path, in a clockwise direction as viewed in FIGS. 6 and 7, orbiting bodily around the spool axis 52. The second axis 256, which is the axis of rotation of the idler gear 270 and of the intermediate gear 280, moves in a circular path about the spool axis 52, in a clockwise direction as viewed in FIGS. 6 and 7.

The crests of the external teeth 272 on the moving idler gear 270 push against the inner peripheral surface 258 which defines the circular opening 254 in the drive disc 240. The force of the moving idler gear 270 is transmitted into the drive disc 240 through the gear teeth 272 on the idler gear and through the inner peripheral surface 258 on the drive disc. This force causes the drive disc 240 to rotate about the spool axis 52 in a clockwise direction as viewed in FIGS. 6 and 7.

As the drive disc 240 rotates, its cam lobe 250 moves circumferentially out of engagement with the end portion 236 of the cam lobe 232 of the cam disc 220. After a second predetermined amount of belt webbing 16 is rewound onto the spool 70, the cam lobe 250 on the drive disc 240 moves through the position shown in FIG. 7 to the position shown in FIG. 8. In the position shown in FIG. 8, the cam lobe 250 on the drive disc 240 is no longer disposed radially inward of the projection 202 on the cinch lever 200. The biasing force of the cinch lever spring 210 causes the cinch lever 200 to pivot in a clockwise direction as viewed in FIGS. 7 and 8 into a cinching position. The cinch lever 200 causes the pilot pawl 140 to pivot radially inward (clockwise as viewed in FIGS. 7 and 8) on the pilot pawl support post 126. The tooth 142 of the pilot pawl 140 moves into the path of revolution of the pilot ratchet teeth 134. The retractor 10 is in a cinching mode.

Should the occupant of the vehicle seat 14 move forward relative to the seat, the occupant engages the belt webbing 16. Forward movement of the occupant then results in withdrawal of belt webbing from the retractor 10. The retractor spool 70 rotates in the belt withdrawal direction 76. The pilot ratchet 130 is fixed for rotation with the spool 70 and also rotates in the belt withdrawal direction 76.

The tooth 142 of the pilot pawl 140, which is disposed in the path of revolution of the ratchet teeth 134 of the pilot ratchet 130, is engaged by one of the moving ratchet teeth. The pilot pawl 140 transmits the rotational force of the pilot ratchet 130 into the actuator 110. The actuator 110 rotates about the spool axis 52. The surfaces defining the cam slot 124 in the actuator 110 move relative to the pin 104 of the lock pawl 100. The surfaces defining the cam slot 124 thus cause the tooth 102 of the lock pawl 100 to pivot radially inward into engagement with the ratchet teeth 82 on the spool locking ratchet wheel 80. Engagement of the lock pawl 100 with the spool locking ratchet wheel 80 blocks rotation of the spool 70 in the belt withdrawal direction 76. This blocks further withdrawal of belt webbing 16 from the retractor 10 to restrain the vehicle occupant.

It should be understood that retraction of the belt webbing 16 onto the spool 70 is not blocked when the retractor 10 is in the cinching mode. This is because the cinch lever 200 is not positively held in its radially inward position but rather is spring biased radially inward into the cinching position. The pilot pawl 140 can be moved radially out by the sloped teeth 134 of the pilot ratchet 130 if the pilot ratchet rotates in the belt winding direction 74, that is, whenever belt webbing 16 is wound onto the spool 70. The retractor 10 is maintained or set in the cinching mode at whatever point the retraction of belt webbing 16 onto the spool 70 ceases.

To take the retractor 10 out of cinching mode, the vehicle occupant disengages the tongue assembly 22 (FIG. 1) from the buckle 26. The seat belt webbing 16 is wound onto the spool 70 of the retractor 10 under the influence of the rewind spring assembly. The retractor spool 70 rotates in the belt winding direction 74°. The cam lobe 250 on the drive disc 240 simultaneously rotates in the belt winding direction 74, that is, clockwise as viewed in FIGS. 8–10. The end portion 253 of the cam lobe 250 of the drive disc 240 engages the end portion 234 of the cam lobe 232 of the cam disc 220.

The drive disc 240 continues to rotate, pushing the cam disc 220 into a position as seen in FIG. 9 in which the end portion 236 of the cam lobe 232 on the cam disc 220 engages the projection 202 on the cinch lever 200. The rotating cam disc 220 causes the cinch lever 200 to move radially outward from the cinching position as viewed in FIG. 9 to a non-cinching position as viewed in FIG. 10. The pilot pawl 140, under the influence of gravity, moves radially outward from the pilot ratchet 130, out of the path of rotation of the pilot ratchet teeth 134. The retractor 10 is thus taken out of the cinching mode.

From the above description of the invention, those skilled in the art will perceive improvements, changes and modifications in the invention. Such improvements, changes and modifications within the skill of the art are intended to be covered by the appended claims.

Having described the invention, we claim:

1. A seat belt webbing retractor comprising:

a spool on which seat belt webbing is wound, said spool being rotatable about a first axis in a belt winding direction and in an opposite belt withdrawal direction;

a ratchet rotatable about said first axis;

a pawl pivotally movable between a disengaged position and an engaged position in engagement with said ratchet to block rotation of said ratchet in the belt withdrawal direction to block rotation of said spool in the belt withdrawal direction;

a gear train having a plurality of gears rotatable in response to rotation of said spool including one gear which is rotatable about a second axis which is spaced from said first axis and which moves around said first axis; and a control mechanism for controlling movement of said pawl into the engaged position to block rotation of said spool in the belt withdrawal direction after a first predetermined amount of seat belt webbing is withdrawn from said spool and then a second predetermined amount of webbing is rewound on said spool;

said control mechanism including a member which rotates in response to rotation of said spool;

said member being rotatable about said first axis in response to movement of said second axis of said one gear around said first axis to control movement of said pawl between the engaged position and the disengaged position.

2. A seat belt webbing retractor as set forth in claim 1 wherein said one gear is circular in configuration and includes a circular array of gear teeth disposed on an outer periphery of said one gear and centered on said second axis, said second axis moving in a circular path about said first axis as said rotatable member rotates about said first axis.

3. A seat belt webbing retractor as set forth in claim 2 wherein said rotatable member has a generally circular outer periphery which is centered on said first axis, a first circumferential portion of said outer periphery of said rotatable member being disposed radially outward of a second circumferential portion of said outer periphery, said first circumferential portion comprising a radially projecting first cam lobe which upon rotation of said rotatable member during withdrawal of the first predetermined amount of seat belt webbing from said spool is movable into a position adjacent to said pawl to support said pawl in the disengaged position.

4. A seat belt webbing retractor as set forth in claim 1 further comprising:

a cinch lever engageable with said lock pawl for moving said lock pawl into the engaged position, said cinch lever being movable between a non-cinching position in which said lock pawl is in the disengaged position and a cinching position in which said cinch lever causes said lock pawl to move into the engaged position, said cinch lever being movable between the non-cinching position and the cinching position in response to rotation of said member about said first axis; and a spring biasing said cinch lever toward the cinching position and biasing said lock pawl into the engaged position.

5. A seat belt Webbing retractor as set forth in claim 1 wherein said gear train includes a pinion gear fixed for rotation with said spool in the belt winding direction and in the belt withdrawal direction, said one gear comprising an idler gear in meshing engagement with said pinion gear and rotatable relative to said pinion gear about said second axis in response to rotation of said pinion gear, said idler gear being supported for orbiting movement about said first axis in response to rotation of said idler gear about said second axis relative to said pinion gear, said gear train further including an externally toothed spur gear fixed for movement with said idler gear and coaxial with said idler gear and an internally toothed ring gear in meshing engagement with said spur gear.

6. A seat belt webbing retractor comprising:

a spool on which seat belt webbing is wound, said spool being rotatable about a first axis in a belt winding direction and in an opposite belt withdrawal direction;

a ratchet rotatable about said first axis;

a lock pawl movable between a disengaged position and an engaged position in engagement with said ratchet to block rotation of said ratchet in the belt withdrawal direction to block rotation of said spool in the belt withdrawal direction;

an actuator movable to move said lock pawl between the disengaged position and the engaged position;

an intermediate lever mounted on said actuator and movable relative to said actuator to effect movement of said actuator;

a cinch lever engageable with said intermediate lever for moving said intermediate lever, said cinch lever being movable between a non-cinching position and a cinching position in which said cinch lever causes said intermediate lever to effect movement of said actuator and in turn movement of said lock pawl;

a spring biasing said cinch lever toward the cinching position and biasing said intermediate lever; and a cinch control mechanism for controlling movement of said cinch lever to control movement of said lock pawl into the engaged position to block rotation of said spool in the belt withdrawal direction after a first predetermined amount of seat belt webbing is withdrawn from said spool and then a second predetermined amount of webbing is rewound on said spool;

said cinch control mechanism comprising means for maintaining said cinch lever in the non-cinching position during withdrawal of the first predetermined amount of webbing including a drive disc rotatable about said first axis and having a cam lobe movable into engagement with said cinch lever upon rotation of said drive disc about said first axis in the belt withdrawal direction and movable out of engagement with said cinch lever upon rotation of said spool in the belt winding direction after winding of said second predetermined amount of belt webbing to allow said spring to move said cinch lever into the cinching position to cause said lock pawl to move into the engaged position.

7. A seat belt webbing retractor as set forth in claim 6 comprising a gear train including a plurality of gears rotatable in response to rotation of said spool, said plurality of gears including one gear which is rotatable about a second axis, said second axis being spaced from said first axis and being movable around said first axis, said drive disc being rotatable about said first axis in response to movement of said one gear and said second axis around said first axis to control movement of said pawl between the engaged position and the disengaged position.

8. A seat belt webbing retractor as set forth in claim 7 wherein said drive disc includes surface means for defining a circular opening in said drive disc centered on said second axis, said one gear being disposed in said opening, said one gear including a circular array of gear teeth disposed on the outer periphery of said one gear and engageable with said surface means for defining a circular opening in said drive disc to cause said drive disc to rotate about the first axis in response to rotation of said one gear about said second axis in response to rotation of said spool.

9. A seat belt webbing retractor as set forth in claim 8 wherein said cinch control mechanism further includes a cam disc rotatable about said first axis, said cam disc having a portion engageable by said drive disc to drive said cam disc for rotation in response to rotation of said drive disc, said cam disc including a second cam lobe axially coincident with said cam lobe on said drive disc, said second cam lobe being movable circumferentially relative to said cinch lever upon rotation of said cam disc to move said cinch lever radially between the cinching position and the non-cinching position.

10. A seat belt webbing retractor as set forth in claim 7 wherein said gear train includes a pinion gear fixed for rotation with said spool in the belt winding direction and in the belt withdrawal direction, said one gear comprising an idler gear in meshing engagement with said pinion gear and rotatable relative to said pinion gear about said second axis in response to rotation of said pinion gear, said idler gear being supported for orbiting movement about said first axis in response to rotation of said idler gear about said second axis relative to said pinion gear, said gear train further including an externally toothed spur gear fixed for movement with said idler gear and coaxial with said idler gear and an internally toothed ring gear in meshing engagement with said spur gear.

11. A seat belt webbing retractor as set forth in claim 6 wherein said cinch lever is supported for radial movement between the non-cinching position and the cinching position, said cam lobe being disposed radially inward of said cinch lever and blocking radially inward movement of said cinch lever from the non-cinching position to the cinching position when said cam lobe is in engagement with said cinch lever, said cam lobe being spaced apart circumferentially from said cinch lever when said cam lobe is not in engagement with said cinch lever and said cinch lever is in the cinching position.

12. A seat belt webbing retractor as set forth in claim 11 wherein said cinch lever has a first portion engageable by said cam lobe to move said cinch lever between the cinching position and the non-cinching position, a second portion in engagement with said spring, and a third portion disposed radially outward of said lock pawl and engageable with said lock pawl under the influence of said spring to urge said lock pawl radially inward into the engaged position.

13. A seat belt webbing retractor comprising:

a spool on which seat belt webbing is wound, said spool being rotatable about a first axis in a belt winding direction and in an opposite belt withdrawal direction;

a ratchet rotatable about said first axis;

a pawl pivotally movable between a disengaged position and an engaged position in engagement with said ratchet to block rotation of said ratchet in the belt withdrawal direction to block rotation of said spool in the belt withdrawal direction;

a gear train having a plurality of gears rotatable in response to rotation of said spool including one gear which is rotatable about a second axis which is spaced from said first axis and which moves around said first axis;

a control mechanism for controlling movement of said pawl into the engaged position to block rotation of said spool in the belt withdrawal direction after a first predetermined amount of seat belt webbing is withdrawn from said spool and then a second predetermined amount of webbing is rewound on said spool;

said control mechanism including a member which rotates in response to rotation of said spool;

said member being rotatable about said first axis in response to movement of said second axis of said one gear around said first axis to control movement of said pawl between the engaged position and the disengaged position;

a cinch lever engageable with said lock pawl for moving said lock pawl into the engaged position, said cinch lever being movable between a non-cinching position in which said lock pawl is in the disengaged position and a cinching position in which said cinch lever causes said lock pawl to move into the engaged position, said cinch lever being moveable between the non-cinching position and the cinching position in response to rotation of said member about said first axis; and a spring biasing said cinch lever toward the cinching position and biasing said lock pawl into the engaged position;

said rotatable member including a first cam lobe movable relative to said cinch lever upon rotation of said rotatable member to move said cinch lever radially between the cinching position and the non-cinching position, said control mechanism further including a cam disc rotatable about said first axis, said cam disc having a portion engageable by said rotatable member to drive said cam disc for rotation in response to rotation of said rotatable member, said cam disc including a second cam lobe axially coincident with said first cam lobe on said rotatable member, said second cam lobe being movable relative to said cinch lever upon rotation of said cam disc to move said cinch lever radially between the cinching position and the non-cinching position.

14. A seat belt webbing retractor comprising:

a spool on which seat belt webbing is wound, said spool being rotatable about a first axis in a belt winding direction and in an opposite belt withdrawal direction;

a ratchet rotatable about said first axis;

a pawl pivotally movable between a disengaged position and an engaged position in engagement with said ratchet to block rotation of said ratchet in the belt withdrawal direction to block rotation of said spool in the belt withdrawal direction;

a gear train having a plurality of gears rotatable in response to rotation of said spool including one gear which is rotatable about a second axis which is spaced from said first axis and which moves around said first axis; and a control mechanism for controlling movement of said pawl into the engaged position to block rotation of said spool in the belt withdrawal direction after a first predetermined amount of seat belt webbing is withdrawn from said spool and then a second predetermined amount of webbing is rewound on said spool;

said control mechanism including a member which rotates in response to rotation of said spool;

said member being rotatable about said first axis in response to movement of said second axis of said one gear around said first axis to control movement of said pawl between the engaged position and the disengaged position;

said rotatable member including surface means for defining a circular opening in said rotatable member centered on said second axis, said one gear being disposed in said opening.

15. A seat belt webbing retractor as set forth in claim 14 including a circular array of gear teeth disposed on the outer periphery of said one gear, said gear teeth on said one gear being in meshing engagement with a second gear of said plurality of gears in said gear train, said second gear having a center of rotation coincident with said first axis, said second gear being driven for rotation by said spool to rotate said one gear, said one gear orbiting about said first axis in response to rotation of said one gear relative to said second gear, said outer peripheral gear teeth on said one gear engaging said surface means for defining a circular opening in said rotatable member to drive said rotatable member for rotation about said first axis.

16. A seat belt webbing retractor comprising:

a spool on which seat belt webbing is wound, said spool being rotatable about a first axis in a belt winding direction and in an opposite belt withdrawal direction;

a ratchet rotatable about said first axis;

a pawl pivotally movable between a disengaged position and an engaged position in engagement with said ratchet to block rotation of said ratchet in the belt withdrawal direction to block rotation of said spool in the belt withdrawal direction;

a gear train having a plurality of gears rotatable in response to rotation of said spool including one gear which is rotatable about a second axis which is spaced from said first axis and which moves around said first axis;

a control mechanism for controlling movement of said pawl into the engaged position to block rotation of said spool in the belt withdrawal direction after a first predetermined amount of seat belt webbing is withdrawn from said spool and then a second predetermined amount of webbing is rewound on said spool;

said control mechanism including a member which rotates in response to rotation of said spool;

said member being rotatable about said first axis in response to movement of said second axis of said one gear around said first axis to control movement of said pawl between the engaged position and the disengaged position; and a cinch lever engageable with said lock pawl for moving said lock pawl into the engaged position, said cinch lever being movable between a non-cinching position in which said lock pawl is in the disengaged position and a cinching position in which said cinch lever causes said lock pawl to move into the engaged position, said cinch lever being movable between the non-cinching position and the cinching position in response to rotation of said rotatable member about said first axis;

said rotatable member comprising a generally planar drive disc including a circular disc portion and a first cam lobe projecting radially outward and axially from said disc portion, said first cam lobe being movable relative to said cinch lever upon rotation of said rotatable member to move said cinch lever radially between the cinching position and the non-cinching position;

said control mechanism further including a cam disc rotatable about said first axis, said cam disc having a second cam lobe engageable by said first cam lobe on said drive disc to drive said cam disc for rotation in response to rotation of said rotatable member, said second cam lobe on said cam disc being axially coincident with said first cam lobe on said rotatable member, said second cam lobe being movable relative to said cinch lever upon rotation of said cam disc to move said cinch lever radially between the cinching position and the non-cinching position.

17. A seat belt webbing retractor as set forth in claim 16 wherein said one gear is circular in configuration and includes a circular array of gear teeth disposed on an outer periphery of said one gear and centered on said second axis, said second axis moving in a circular path around said first axis as said rotatable member rotates about said first axis, said one gear being disposed in a circular opening in said disc portion of said drive disc.

* * * * *